(12) United States Patent
Santra et al.

(10) Patent No.: US 7,350,574 B2
(45) Date of Patent: *Apr. 1, 2008

(54) METHODS OF RETARDING THE SETTING OF A CEMENT COMPOSITION USING BIODEGRADABLE MONOMERS

(75) Inventors: Ashok K. Santra, Duncan, OK (US); Russell M. Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/158,531

(22) Filed: Jun. 22, 2005

(65) Prior Publication Data

US 2006/0289162 A1 Dec. 28, 2006

(51) Int. Cl.
*E21B 33/13* (2006.01)
*E21B 33/14* (2006.01)

(52) U.S. Cl. .................. 166/293; 166/292; 166/294; 166/295; 106/727; 106/728; 106/808; 106/823; 524/2

(58) Field of Classification Search ............... 166/292, 166/293, 294, 295; 106/727, 728, 808, 823; 524/2
See application file for complete search history.

(56) References Cited

U.S. PATENT DOCUMENTS

| | | | |
|---|---|---|---|
| 2,805,719 A | 9/1957 | Anderson | |
| 3,748,159 A | 7/1973 | George | |
| 4,120,736 A | 10/1978 | Childs et al. | |
| 4,500,357 A | 2/1985 | Brothers et al. | |
| 4,582,139 A | 4/1986 | Childs et al. | |
| 4,676,832 A | 6/1987 | Childs et al. | |
| 4,941,536 A | 7/1990 | Brothers et al. | |
| 4,997,487 A | 3/1991 | Vinson et al. | |
| 5,049,288 A | 9/1991 | Brothers et al. | |
| 5,096,983 A * | 3/1992 | Gerber ...................... | 525/506 |
| 5,184,680 A | 2/1993 | Totten et al. | |
| 5,220,960 A | 6/1993 | Totten et al. | |
| 5,263,542 A | 11/1993 | Brothers et al. | |
| 5,264,470 A | 11/1993 | Eoff | |

(Continued)

OTHER PUBLICATIONS

Santra, Ashok et al., U.S. Appl. No. 11/158,693, filed Jun. 22, 2005, "Cement Compositions Comprising Biodegradable Monomers for Retarding the Setting Thereof".

(Continued)

*Primary Examiner*—George Suchfield
(74) *Attorney, Agent, or Firm*—Craig W. Roddy; Baker Botts, LLP.

(57) ABSTRACT

Methods of retarding the setting of a cement composition comprise including one or more secondary amines substituted with a carboxyl group or salts thereof (e.g., 3-hydroxy N,N'-iminodisuccinic acid) in the cement composition. The inclusion of such materials in cement compositions may be highly beneficial. In wellbores having BHCT's of less than or equal to about 250° F., the use of the secondary amine as the set retarder ensures that the thickening time of the cement composition is sufficient to allow the cement composition to be pumped to its desired downhole location. Further, the secondary amine may be used in combination with conventional set retarders to enhance the ability of those retarders to increase the thickening time of the cement composition at higher BHCT's, e.g., from about 250° F. to about 525° F.

61 Claims, 2 Drawing Sheets

U.S. PATENT DOCUMENTS

| | | | |
|---|---|---|---|
| 5,273,580 | A | 12/1993 | Totten et al. |
| 5,281,270 | A | 1/1994 | Totten et al. |
| 5,340,397 | A | 8/1994 | Brothers |
| 5,355,955 | A | 10/1994 | Rodrigues et al. |
| 5,398,759 | A | 3/1995 | Rodrigues et al. |
| 5,417,759 | A * | 5/1995 | Huddleston .................. 106/727 |
| 5,421,879 | A | 6/1995 | Rodrigues et al. |
| 5,421,881 | A | 6/1995 | Rodrigues et al. |
| 5,447,197 | A | 9/1995 | Rae et al. |
| 5,472,051 | A | 12/1995 | Brothers |
| 5,484,478 | A | 1/1996 | Brothers |
| 5,536,311 | A | 7/1996 | Rodrigues |
| 5,547,506 | A | 8/1996 | Rae et al. |
| 5,641,352 | A * | 6/1997 | Jeknavorian et al. ....... 106/808 |
| 5,672,203 | A | 9/1997 | Chatterji et al. |
| 5,871,577 | A | 2/1999 | Chatterji et al. |
| 6,173,778 | B1 | 1/2001 | Rae et al. |
| 6,190,451 | B1* | 2/2001 | Soya et al. ................. 106/808 |
| 6,227,294 | B1 | 5/2001 | Chatterji et al. |
| 6,372,037 | B1 | 4/2002 | Lebo, Jr. et al. |
| 6,419,016 | B1 | 7/2002 | Reddy et al. |
| 6,591,909 | B1 | 7/2003 | Dao et al. |
| 6,793,730 | B2 | 9/2004 | Reddy et al. |
| 6,800,128 | B2 | 10/2004 | Dao et al. |
| 2004/0211562 | A1 | 10/2004 | Brothes et al. |
| 2004/0262001 | A1 | 12/2004 | Caveny et al. |
| 2005/0109507 | A1 | 5/2005 | Heathman et al. |
| 2006/0162930 | A1* | 7/2006 | Gronsveld et al. .......... 166/293 |
| 2006/0167133 | A1* | 7/2006 | Gromsveld et al. ......... 523/130 |
| 2006/0288910 | A1* | 12/2006 | Santra et al. ............... 106/727 |

OTHER PUBLICATIONS

Halliburton brochure entitled "HR® -4 Cement Retarder" dated 1999.

Halliburton brochure entitled "HR®-5 Cement Additive" dated 1998.

Halliburton brochure entitled "HR® -6L Cement Retarder" datede 1999.

Halliburton brochure entitled "HR®-7 Cement Retarder" dated 1999.

Halliburton brochure entitled "HR®-12 Cement Retarder" dated 1999.

Halliburton brochure entitled "HR®-15 Cement Retarder" dated 1999.

Halliburton brochure entitled "HR®-25 Cement Retarder" dated 1999.

Halliburton brochure entitled "Micro Matrix Cement Retarder" dated 1999.

Halliburton brochure entitled "SCR-100 Cement Retarder" dated 1999.

Halliburton brochure entitled "SCR-500L™ High-Temperature Retarder" dated 2000.

Halliburton brochure entitled "SSA-1 Strength-Stabilizing Agent" dated 1998.

Halliburton brochure entitled "SSA-2 Coarse Silica Flour" dated 1999.

Okano, Saroshi et al., "Bleach-Fixer Using A New Biodegradable Chelating Agent".

Reddy, B. Raghava et al., Patent application "Methods of Cementing In Subterranean formations" filed Oct. 11, 2004, as U.S. Appl. No. 10/963,036.

Chatterji, Jiten et al., Patent application "Set Retarder Compositions, Cement Compositions, And Associated Methods" filed Oct. 11, 2004 as U.S. Appl. No. 10/963,035.

* cited by examiner

METHODS OF RETARDING THE SETTING OF A CEMENT COMPOSITION USING BIODEGRADABLE MONOMERS

FIELD OF THE INVENTION

The present invention generally relates to cementing, and more particularly to methods of retarding the setting of a cement composition by including certain monomers (i.e., biodegradable secondary amines substituted with carboxyl groups or salts thereof), copolymers thereof, terpolymers thereof, and/or block polymers thereof in the cement composition.

BACKGROUND AND SUMMARY OF THE INVENTION

The following paragraphs contain some discussion, which is illuminated by the innovations disclosed in this application, and any discussion of actual or proposed or possible approaches in this Background section does not imply that those approaches are prior art.

Natural resources such as oil and gas residing in a subterranean formation or zone are usually recovered by drilling a wellbore down to the subterranean formation while circulating a drilling fluid in the wellbore. After terminating the circulation of the drilling fluid, a string of pipe, e.g., casing is run in the wellbore. The drilling fluid is then usually circulated downwardly through the interior of the pipe and upwardly through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

These cementing operations generally occur in a wide variety of wellbores ranging, for example, from shallow wells of less than about 1,000 feet to extremely deep wells of greater than about 35,000 feet. The cement composition desirably remains in a pumpable state until it has been placed at its desired location in the wellbore, for example, in the annulus. However, the thickening time of the composition may be unacceptably short to allow it to be pumped to its desired downhole location. As a result, the cement slurry may set in an undesirable location such as inside the casing, which may lead to expensive drill out operations. Set retarders have typically been included in cement compositions to lengthen the thickening times thereof and thereby delay the setting of the compositions until after placement. Some set retarders that are commonly used in cement compositions include lignosulfonates, hydroxycarboxy acids, phosphonic acid derivatives, synthetic polymers (e.g., copolymers of 2-acrylamido-2-methylpropane sulfonic acid (AMPS)), borate salts, and combinations thereof.

Often the temperatures in a wellbore increase from the top down to the bottom of the wellbore. Unfortunately, increasing the temperature of a cement composition results in a decrease in the thickening time of the composition. Thus, in wellbores having bottom hole circulating temperatures (BHCT) above about 350° F., conventional set retarders commonly fail to sufficiently lengthen the thickening times of cement compositions to allow those compositions to be pumped to their desired downhole locations. Therefore, the use of such set retarders limits the depths and associated temperatures at which wellbores may be drilled and isolated with cement compositions.

To overcome such limitations, traditional set retarders have been supplemented with ethylenediamine tetra acetic acid (EDTA) or its sodium (Na) salt to intensify their retardation effect on the setting of cement compositions at higher temperatures. The combination of the traditional set retarders with the EDTA or its Na salt typically provides for desirable levels of set retardation in cement compositions subjected to BHCT's as high as 525° F. or even higher. However, EDTA and its Na salt suffer from the drawback of being toxic and having a relatively low biodegradability, i.e., its susceptibility to breakdown by microorganisms. As such, their use is often limited to low concentrations or even restricted entirely in places such as the United Kingdom and the North Sea where strict environmental regulations apply. Further, EDTA and its Na salt are costly to produce. It is therefore desirable to develop a less expensive set retarder composition that is non-toxic and exhibits a relatively high biodegradability.

Additional information relating to conventional set retarders may be found in U.S. patent application Ser. Nos. 10/963,036 and 10/963,035, filed on Oct. 11, 2004, each of which is incorporated herein by reference.

Some teachings and advantages found in the present application are summarized briefly below. However, note that the present application may disclose multiple embodiments, and not all of the statements in this section necessarily relate to all of those embodiments. Moreover, none of these statements limit the claims in any way.

According to various embodiments, methods of retarding the setting of a cement composition comprise including one or more secondary amines substituted with a carboxyl group or salts thereof (e.g., 3-hydroxy N,N'-iminodisuccinic acid) in the cement composition. As used herein, "secondary amines substituted with a carboxyl group" not only refers to the amines themselves but also refers to copolymers thereof, terpolymers thereof, block polymers thereof, or any combination thereof. The inclusion of such materials in cement compositions may be highly beneficial. In wellbores having bottom hole circulating temperatures (BHCT's) of less than or equal to about 250° F., the use of the secondary amine as the set retarder ensures that the thickening time of the cement composition is sufficient to allow the cement composition to be pumped to its desired downhole location. Further, the secondary amine may be used in combination with conventional set retarders to enhance the ability of those retarders to increase the thickening time of the cement composition at higher BHCT's, e.g., from about 250° F. to about 525° F.

In addition, such secondary amines substituted with a carboxyl group or salts thereof exhibit relatively low levels of toxicity and relatively high biodegradability percentages (e.g., greater than 60%). Thus, they may be employed in cement compositions without being concerned that they could harm the environment. Advantageously, they can be used in places that have strict requirements on the levels of toxicity and biodegradability. In addition, the secondary amines may be produced at relatively low cost. As such, their inclusion in cement compositions would not prohibitively raise the cost of producing such compositions.

DETAILED DESCRIPTION OF THE PREFERRED EMBODIMENTS

Figure 1:
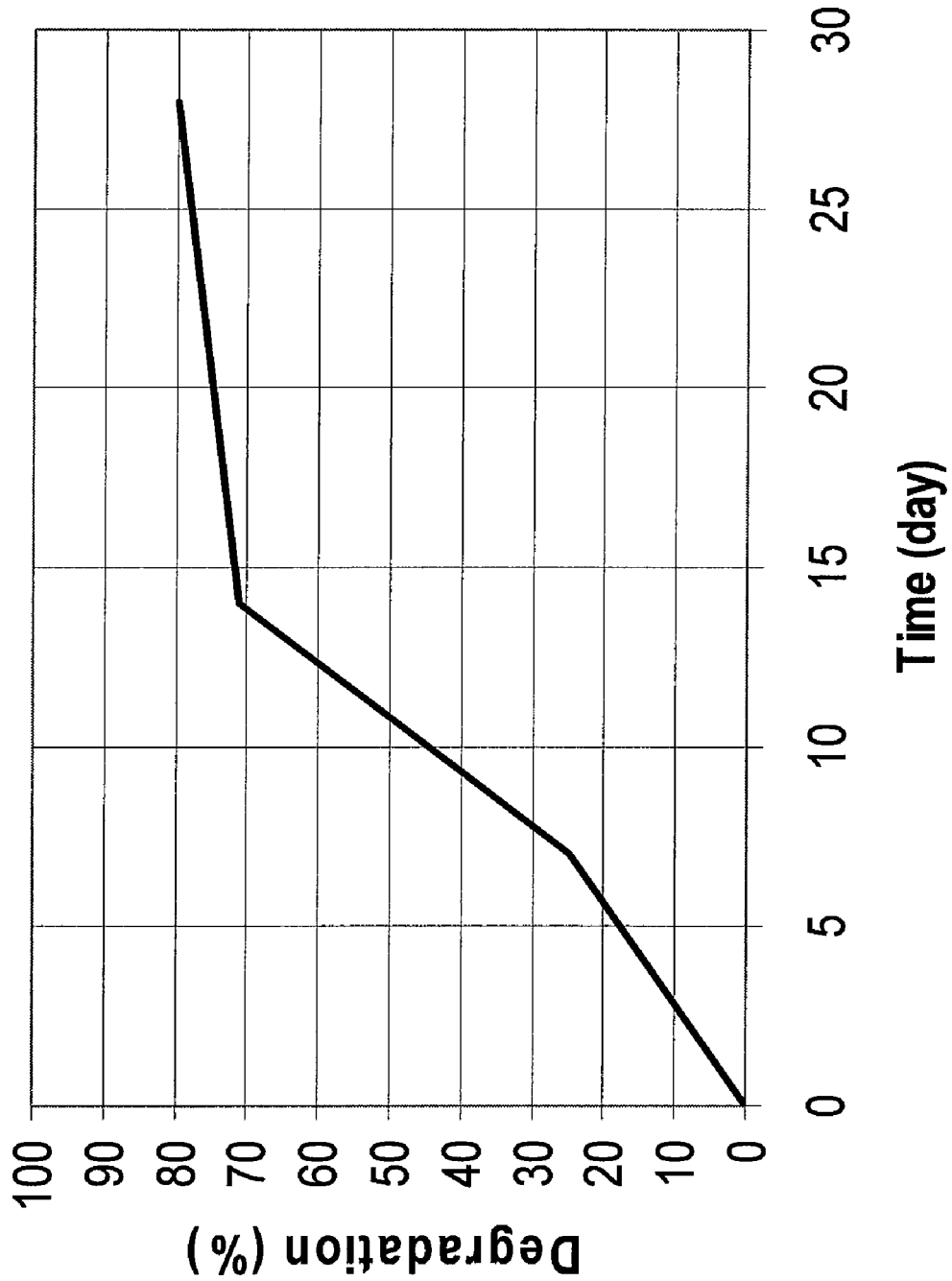
FIG. 1 depicts a graph illustrating the biodegradability of 3-hydroxy N,N'-iminodisuccinic acid over a period of 28 days.

Cement compositions include cement, a fluid, and a set retarder composition for increasing the thickening time of the compositions and thus delaying the setting thereof. In some embodiments, the set retarder composition primarily comprises a secondary amine substituted with a carboxyl group, particularly when it may be exposed to temperatures less than or equal to about 250° F. In these embodiments, the secondary amine may be capable of increasing the thickening time of the cement composition to a time in a the range of from about 3 hours to about 8 hours. In alternative embodiments, the set retarder composition may comprise a conventional set retarder and a secondary amine substituted with a carboxyl group for enhancing the ability of the conventional set retarder to increase the thickening time of the cement compositions, particularly when it may be exposed to temperatures in a range of from about 250° F. to about 525° F. In these embodiments, the secondary amine may be capable of increasing the thickening time to a time in the range of from about 3 hours to about 8 hours, alternatively from about 4 hours to about 5 hours.

The secondary amine substituted with the carboxyl group desirably exhibits a high biodegradability and a low toxicity, allowing it to be employed in places where strict environmental regulations apply such as the North Sea and the United Kingdom. It may exhibit a biodegradability over a period of 28 days of greater than about 60% biological oxygen demand (BOD). In this application, the standard test applied to determine biodegradability is OECD (Organisation for Economic Co-operation and Development) Guidelines for the Testing of Chemicals, Test No. 302C: Inherent Biodegradability: Modified MITI Test (II). Further, according to a standard fish toxicity test, the secondary amine may have a 96-hour $LC_{50}$ of greater than about 2,000 ppm, indicating that it is not toxic to fish (in the U.S., chemicals having a $LC_{50}$<1.0 ppm are labeled toxic to fish). Examples of suitable secondary amines substituted with carboxyl groups include but are not limited to the following monomers: ethylenediamine-N,N'-disuccinic acid (EDDS) or salts thereof; carboxymethylaspartic acid (CMAA) or salts thereof; carboxyethylaspartic acid (CEAA) or salts thereof; iminodiacetic acid (IDA) or salts thereof; iminodisuccinic acid (IDS) or salts thereof; methylglycinedisuccinic acid (MGDS) or salts thereof; glutamic (salt)-N,N' diacetic acid (GLDA) or salts thereof; methylglycinediacetic acid (MGDA) or salts thereof; 3-hydroxy N,N'-iminodisuccinic acid (HIDS) or salts thereof; and combinations thereof. Additional examples include polymers made up of any combination of the foregoing monomers including copolymers thereof, terpolymers thereof, block polymers thereof, and combinations thereof. The carboxyl group substituent may be, for example, —COOH, —COONa, —COOK, —COOLi, or $COONH_4$. The foregoing monomers and polymers thereof not only serve as good set retarders or set retarder intensifiers, they also serve as good cement dispersants in the cement compositions.

FIG. 1 is a graph of the degradation of HIDS as a function of time. It illustrates that the degradation of HIDS increased to more than 60% BOD after a period of about 13 days and then increased to about 80% BOD after a total period of about 28 days. Thus, HIDS is a very environmentally friendly amine, making it a good candidate for use in cement compositions.

The secondary amine substituted with a carboxyl group may be present in cement compositions in an amount sufficient to provide the desired level of set retardation, which may be based on a number of factors including the desired thickening time of the compositions, the bottom hole circulating temperature (BHCT) and the bottom hole pressure of the wellbore in which the compositions are to be placed, and the amount, if any, of conventional set retarder present in the compositions. Higher concentrations of the secondary amine may be needed with increasing BHCT. In various embodiments, the amount of the secondary amine substituted with the carboxyl group present in the cement compositions may be in the range of from about 0.001% to about 10% by weight of the cement (bwoc), or alternatively in the range of from about 0.1% to about 5% bwoc.

As mentioned previously, in some embodiments, the secondary amine substituted with the carboxyl group may be used in conjunction with a conventional set retarder. Any suitable conventional set retarder as deemed appropriate by one skilled in the art may be utilized. Examples of suitable conventional set retarders include but are not limited to lignosulphonate, commercially available from Halliburton Energy Services, Inc. under the tradename of HR-5L retarder, lignosulfates, hydroxycarboxy acids, phosphonic acid derivatives, borate salts, and combinations thereof. Examples of hydroxycarboxy acids include tartaric acid, commercially available from Halliburton Energy Services, Inc. under the tradename of HR-25 retarder, gluconic acid, citric acid, gluconoheptanoic acid, and combinations thereof. An example of a set retarder additive comprising a phosphonic acid derivative is MIRCRO MATRIX CEMENT RETARDER additive, which is sold by Halliburton Energy Services, Inc. and described in U.S. Pat. Nos. 5,340,397 and 5,484,478, each of which is incorporated by reference herein in its entirety. Examples of borate salts include potassium pentaborate, sodium tetraborate, borax, and combinations thereof. A suitable borate salt is commercially available from Halliburton Energy Services, Inc. under the tradename of COMPONENT R retarder. Examples of synthetic polymers include copolymers of olefinically unsaturated non-acrylate sulfonate monomers and olefmically unsaturated carboxylic acid monomers, e.g., a copolymer of styrene sulfonic acid and maleic anhydride, which are described in U.S. patent application Ser. No. 10/963,036, filed on Oct. 11, 2004, entitled "Methods of Cementing in Subterranean Formations." Another suitable synthetic polymer is SCR-100 retarder, which is sold by Halliburton Energy Services, Inc. and described in U.S. Pat. Nos. 4,941,536, 5,049,288, and 5,472,051, each of which is incorporated by reference herein in its entirety. Yet another suitable synthetic polymer is SCR-500 retarder, which is sold by Halliburton Energy Services, Inc. and described in U.S. Pat. No. 5,536,311, also incorporated by reference herein in its entirety.

The amount of the conventional retarder present in the cement compositions may be based on a number of factors including the desired thickening time of the compositions, the bottom hole circulating temperature (BHCT) and the bottom hole pressure of the wellbore in which the compositions are to be placed, and the amount and type of the secondary amine substituted with the carboxyl group present in the compositions. Higher concentrations of the conventional retarder may be needed with increasing BHCT. In various embodiments, the amount of the conventional retarder present in the cement compositions may be less than or equal to about 10% bwoc, or alternatively less than or equal to about 5% bwoc. In some embodiments, a weight ratio of the secondary amine substituted with the carboxyl group to the conventional primary retarder may range from about 1:0 to about 1:50.

Cements deemed appropriate by one skilled in the art may be employed in the cement compositions. For example, the cement may be a hydraulic cement composed of calcium, aluminum, silicon, oxygen, and/or sulfur which sets and hardens by reaction with water. Examples of hydraulic cements include but are not limited to Portland cements, pozzolan cements, gypsum cements, high alumina content cements, silica cements, and high alkalinity cements. In some embodiments, the cement may be a class A, B, C, G, or H Portland cement. The cement compositions may also include a sufficient amount of fluid to form a pumpable cementitious slurry. Examples of suitable fluids include but are not limited to fresh water or salt water, e.g., an unsaturated aqueous salt solution or a saturated aqueous salt solution such as brine or seawater. In some embodiments, the water may be present in the cement compositions in an amount in the range of from about 33% to about 200% bwoc, alternatively from about 35% to about 60% bwoc.

In various embodiments, the cement compositions also include a suitable strength-retrogression additive as deemed appropriate by one skilled in the art. As used herein, "strength-retrogression additive" refers to materials that are capable of preventing the strength retrogression of a set cement composition when exposed to high temperatures. Examples of suitable strength-retrogression additives include but are not limited to crystalline silica such as coarse grain crystalline silica, fine grain crystalline silica, and combinations thereof. An example of a suitable fine grain crystalline silica is SSA-1 additive, commercially available from Halliburton Energy Services, Inc. An example of a suitable course grain crystalline silica is SSA-2 additive, also commercially available from Halliburton Energy Services, Inc. The amount of the strength-retrogression additive present in the cement compositions may be selected to provide the desired level of strength retrogression prevention. In some embodiments, the amount of the strength-retrogression additive present may be in the range of from about 10% to about 100% bwoc.

As deemed appropriate by one skilled in the art, additional additives may be added to the cement compositions for improving or changing the properties of the cement compositions. Examples of suitable additives include but are not limited to fluid loss control agents, weighting agents, defoamers, dispersing agents, set accelerators, and formation conditioning agents. Another example of a suitable additive is a density reducing additive such as hollow glass beads, hollow cenospheres, and the like.

The foregoing cement compositions may be prepared using any suitable technique known in the art. The various components in the cement compositions may be combined in any suitable order. In some embodiments, particularly when the amine substituted with the carboxyl group is a solid, it may be dry blended with the cement and other dry additives either on-site near where it is to be used or off-site, in which case the dry blend may be transported to the on-site location. In other embodiments, particularly when the amine substituted with the carboxyl group is a liquid, it may be added to the mix water used to make the cement composition.

Figure 2:
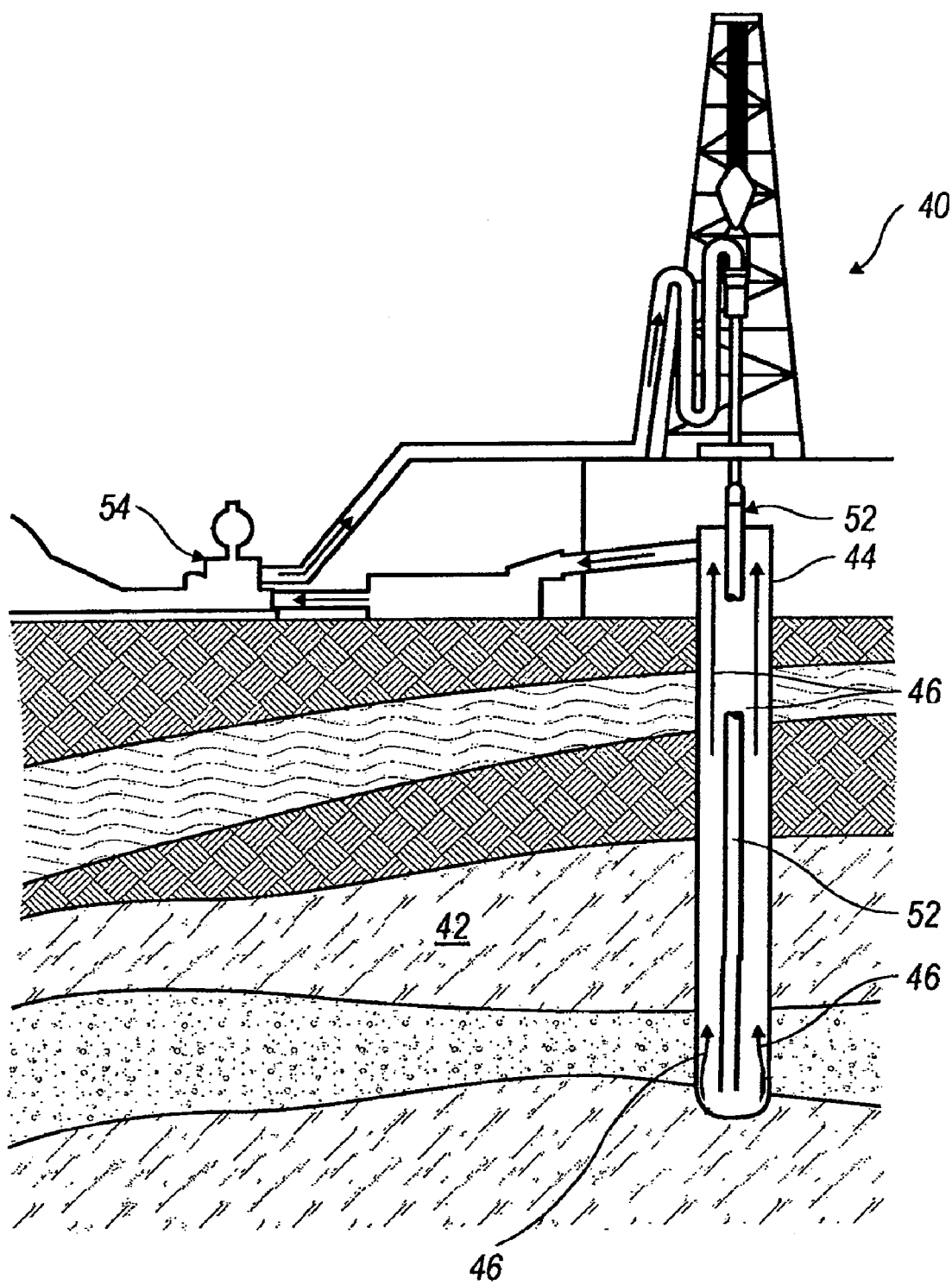
FIG. 2 depicts a side plan view of a drill rig and a wellbore for recovering oil or gas from a subterranean formation penetrated by the wellbore.

FIG. 2 illustrates using a cement composition comprising the set retarder composition described herein. An oil rig 40 may be positioned near the surface of the earth 42 for later recovering oil from a subterranean formation (not shown). A wellbore 44 may be drilled in the earth such that it penetrates the subterranean formation. A pipe 52, e.g., a casing, may extend down through wellbore 44 for delivering fluid to and/or from the wellbore. In a primary cementing process, the cement composition may be pumped down through pipe 52 and up through the annulus of wellbore 44 as indicated by arrows 46 using one or more pumps 54. The cement composition may be allowed to set within the annulus, thereby sealing wellbore 44. Due to the presence of the set retarder composition in the cement composition, the thickening time of the cement composition is desirably sufficient to allow it to be pumped into the annulus such that it substantially fills the annulus before setting. Any secondary cementing operations known in the art may also be performed using the cement composition. For example, a squeeze cementing technique may be employed to plug permeable areas or voids in the cement sheath or the pipe 52. Again, the thickening time of the cement composition is sufficient to ensure that the cement composition remains pumpable until it has been placed in its desired location. By way of example, the BHCT's of wellbore 44 may be in the range of from about 150° F. to about 525° F., and the resulting thickening time of the cement composition may range from about 3 hours to about 8 hours.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Various samples of cement slurries were prepared and tested for thickening times according to API Recommended Practice For Testing Well Cements 10B, $23^{rd}$ edition, April 2002. Each test sample contained class H cement, 35% bwoc of SSA-1 strength-retrogression additive, a sufficient amount of water to form a slurry having a density of 16.2 pounds per gallon, and different amounts of HIDS and/or HR-25 retarder, as shown in Table 1 below. The thickening times were tested using a HPHT (high pressure-high temperature) consistometer. The thickening times obtained for each sample at different temperatures are also given in Table 1.

TABLE 1

| Sample No. | HIDS, % bwoc | HR-25 retarder, % bwoc | Thickening Time @ 250° F., hr.:min. | Thickening Time @ 300° F., hr.:min. | Thickening Time @ 350° F., hr.:min. |
| --- | --- | --- | --- | --- | --- |
| 1 | 1.0 | 0 | 8:00 | 1:27 | |
| 2 | 1.0 | 0.25 | | 7:18 | |
| 3 | 1.0 | 0.5 | | | 3:55 |

The results in Table 1 show that HIDS is an extremely good retarder by itself up to about 250° F. Further, HIDS works well to intensify the effect of other retarders such as HR-25 retarder up to at least 350° F. These examples are desirably extended life slurries having shelf lives up to 3 to 4 weeks.

According to various embodiments, methods of cementing in a wellbore comprise: introducing a cement composition comprising a secondary amine substituted with a carboxyl group into the wellbore; and allowing the cement composition to set. In yet more embodiments, methods of cementing in a wellbore comprise: preparing a cement composition by combining cement, water, and a secondary amine substituted with a carboxyl group; displacing the cement composition into the wellbore; and allowing the cement composition to set.

In more embodiments, cement compositions comprise: a secondary amine substituted with a carboxyl group for retarding a set time of the cement composition. In further embodiments, cement compositions comprise: a cement; a strength-retrogression additive; water for making the cement composition pumpable; a primary retarder for increasing a thickening time of the cement composition; and a secondary amine substituted with a carboxyl group for enhancing the ability of the primary retarder to increase a thickening time of the cement composition. In additional embodiments, set retarder compositions for use as additives in cement compositions comprise a secondary amine substituted with a carboxyl group.

MODIFICATIONS AND VARIATIONS

The foregoing methods of cementing a wellbore may be applied to various types of wells, including injection wells, single production wells such as oil and gas wells, and multiple completion wells.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of cementing in a wellbore, comprising:
   introducing a cement composition comprising a secondary amine substituted with a carboxyl group into the wellbore; and
   allowing the cement composition to set.

2. The method of claim 1, wherein the wellbore has a bottom hole circulating temperature of about 250° F. or less.

3. The method of claim 1, wherein the secondary amine substituted with the carboxyl group increases a thickening time of the cement composition to a time in the range of from about 3 hours to about 8 hours.

4. The method of claim 1, wherein the secondary amine substituted with the carboxyl group increases a thickening time of the cement composition to a time in the range of from about 4 hours to about 5 hours.

5. The method of claim 1, wherein the cement composition further comprises a primary set retarder for increasing the thickening time of the cement composition.

6. The method of claim 5, wherein the secondary amine substituted with the carboxyl group enhances the ability of the primary set retarder to increase the thickening time of the cement composition.

7. The method of claim 6, wherein the wellbore has a bottom hole circulating temperature in a range of from about 250° F. to about 525° F.

8. The method of claim 7, wherein the cement composition has a thickening time in a range of from about 4 hours to about 5 hours.

9. The method of claim 5, wherein the primary set retarder comprises a component selected from the group consisting of: a lignosulfate, a lignosulphonate, a hydroxycarboxy acid, a phosphonic acid derivative, a borate salt, a synthetic polymer, and combinations thereof.

10. The method of claim 5, wherein the primary set retarder comprises a component selected from the group consisting of: a tartaric acid, a gluconic acid, a citric acid, a gluconoheptanoic acid, a copolymer of an olefinically unsaturated non-acrylate sulfonate monomer and an olefinically unsaturated carboxylic acid monomer, and combinations thereof.

11. The method of claim 5, wherein an amount of the primary set retarder present in the cement composition is less than or equal to about 10% bwoc.

12. The method of claim 1, wherein the cement composition optionally further comprises a primary set retarder for increasing the thickening time of the cement composition, and
   wherein the weight ratio of the secondary amine substituted with the carboxyl group to the primary retarder is in a range of from about 1:0 to about 1:50.

13. The method of claim 1, wherein the secondary amine substituted with the carboxyl group has a biodegradability of greater than or equal to about 60% BOD.

14. The method of claim 1, wherein the secondary amine substituted with the carboxyl group comprises 3-hydroxy N,N'-iminodisuccinic acid.

15. The method of claim 14, wherein the secondary amine substituted with the carboxyl group has a biodegradability of greater than or equal to about 60% BOD after a period of about 13 days and of greater than about 80% BOD after a period of about 28 days.

16. The method of claim 1, wherein the secondary amine substituted with the carboxyl group has a 96 hour $LC_{50}$ of greater than about 2,000 ppm.

17. The method of claim 1, wherein the secondary amine substituted with the carboxyl group is present in an amount ranging from about 0.001% to about 10% by weight of the cement composition.

18. The method of claim 1, wherein the cement composition further comprises water present in an amount ranging from about 33% to about 200% bwoc.

19. The method of claim 1, wherein the cement composition further comprises a strength-retrogression additive present in an amount ranging from about 10% to about 100% bwoc.

20. The method of claim 1, wherein the secondary amine substituted with the carboxyl group comprises a component selected from the group consisting of: an ethylenediamine- N,N'-disuccinic acid, a salt of an ethylenediamine-N,N'-disuccinic acid, a carboxymethylaspartic acid, a salt of a carboxymethylaspartic acid, a carboxyethylaspartic acid, a salt of a carboxyethylaspartic acid, an iminodiacetic acid, a salt of a iminodiacetic acid, an imminodisuccinic acid, a salt of an imminodisuccinic acid, a methylglycinedisuccinic acid, a salt of a methylglycinedisuccinic acid, a glutamic (salt)-N,N'diacetic acid, a salt of a glutamic (salt)-N,N'diacetic acid, a methylglycinediacetic acid, a salt of a methylglycinediacetic acid, a 3-hydroxy N,N'-iminodisuccinic acid, a salt of a 3-hydroxy N,N'-iminodisuccinic acid, copolymers thereof, terpolymers thereof, block polymers thereof, and combinations thereof.

21. A method of retarding a setting of a cement composition, comprising:
including a secondary amine substituted with a carboxyl group in the cement composition.

22. The method of claim 21, further comprising pumping the cement composition into a wellbore having a bottom hole circulating temperature of about 250° F. or less.

23. The method of claim 21, wherein the secondary amine substituted with the carboxyl group increases a thickening time of the cement composition a time in the range of from about 3 hours to about 8 hours.

24. The method of claim 21, wherein the secondary amine substituted with the carboxyl group increases a thickening time of the cement composition to a time in the range of from about 4 hours to about 5 hours.

25. The method of claim 21, wherein the cement composition further comprises a primary set retarder for increasing the thickening time of the cement composition.

26. The method of claim 25, wherein the secondary amine substituted with the carboxyl group enhances the ability of the primary set retarder to increase the thickening time of the cement composition.

27. The method of claim 26, further comprising pumping the cement composition into a wellbore having a bottom hole circulating temperature in a range of from about 250° F. to about 525° F.

28. The method of claim 27, wherein the cement composition has a thickening time in a range of from about 4 hours to about 5 hours.

29. The method of claim 25, wherein the primary set retarder comprises a component selected from the group consisting of: a lignosulfate, a lignosulphonate, a hydroxy-carboxy acid, a phosphonic acid derivative, a borate salt, a synthetic polymer, and combinations thereof.

30. The method of claim 25, wherein the primary set retarder comprises a component selected from the group consisting of: a tartaric acid, a gluconic acid, a citric acid, a gluconoheptanoic acid, a copolymer of an olefinically unsaturated non-acrylate sulfonate monomer and an olefmically unsaturated carboxylic acid monomer, and combinations thereof.

31. The method of claim 25, wherein an amount of the primary set retarder present in the cement composition is less than or equal to about 10% bwoc.

32. The method of claim 21, wherein the cement composition optionally further comprises a primary set retarder for increasing the thickening time of the cement composition, and
wherein the weight ratio of the secondary amine substituted with the carboxyl group to the primary retarder is in a range of from about 1:0 to about 1:50.

33. The method of claim 21, wherein the secondary amine substituted with the carboxyl group has a biodegradability of greater than or equal to about 60% BOD.

34. The method of claim 21, wherein the secondary amine substituted with the carboxyl group comprises 3-hydroxy N,N'-iminodisuccinic acid.

35. The method of claim 34, wherein the secondary amine substituted with the carboxyl group has a biodegradability of greater than or equal to about 60% BOD after a period of about 13 days and of greater than about 80% BOD after a period of about 28 days.

36. The method of claim 21, wherein the secondary amine substituted with the carboxyl group has a 96 hour $LC_{50}$ of greater than about 2,000 ppm.

37. The method of claim 21, wherein the secondary amine substituted with the carboxyl group is present in an amount ranging from about 0.001% to about 10% by weight of the cement composition.

38. The method of claim 21, wherein the cement composition further comprises water present in an amount ranging from about 33% to about 200% bwoc.

39. The method of claim 21, wherein the cement composition further comprises a strength-retrogression additive present in an amount ranging from about 10% to about 100% bwoc.

40. The method of claim 21, wherein the secondary amine substituted with the carboxyl group comprises a component selected from the group consisting of: an ethylenediamine-N,N'-disuccinic acid, a salt of an ethylenediamine-N,N'-disuccinic acid, a carboxymethylaspartic acid, a salt of a carboxymethylaspartic acid, a carboxyethylaspartic acid, a salt of a carboxyethylaspartic acid, an iminodiacetic acid, a salt of a iminodiacetic acid, an imminodisuccinic acid, a salt of an imminodisuccinic acid, a methylglycinedisuccinic acid, a salt of a methylglycinedisuccinic acid, a glutamic (salt)-N,N'diacetic acid, a salt of a glutamic (salt)-N,N'diacetic acid, a methylglycinediacetic acid, a salt of a methylglycinediacetic acid, a 3-hydroxy N,N'-iminodisuccinic acid, a salt of a 3-hydroxy N,N'-iminodisuccinic acid, copolymers thereof, terpolymers thereof, block polymers thereof, and combinations thereof.

41. A method of cementing in a wellbore, comprising:
preparing a cement composition by combining cement, water, and a secondary amine substituted with a carboxyl group;
displacing the cement composition into the wellbore; and
allowing the cement composition to set.

42. The method of claim 41, wherein the cement composition is allowed to set in an annulus of the wellbore.

43. The method of claim 41, wherein the wellbore has a bottom hole circulating temperature of about 250° F. or less.

44. The method of claim 41, wherein the secondary amine substituted with the carboxyl group increases a thickening time of the cement composition to a time in the range of from about 3 hours to about 8 hours.

45. The method of claim 41, wherein the secondary amine substituted with the carboxyl group increases a thickening time of the cement composition to a time in the range of from about 4 hours to about 5 hours.

46. The method of claim 41, wherein the cement composition further comprises a primary set retarder for increasing the thickening time of the cement composition.

47. The method of claim 46, wherein the secondary amine substituted with the carboxyl group enhances the ability of the primary set retarder to increase the thickening time of the cement composition.

48. The method of claim 47, wherein the weilbore has a bottom hole circulating temperature in a range of from about 250° F. to about 525° F.

49. The method of claim 48, wherein the cement composition has a thickening time in a range of from about 4 hours to about 5 hours.

50. The method of claim 46, wherein the primary set retarder comprises a component selected from the group consisting of: a lignosulfate, a lignosulphonate, a hydroxycarboxy acid, a phosphonic acid derivative, a borate salt, a synthetic polymer, and combinations thereof.

51. The method of claim 46, wherein the primary set retarder comprises a component selected from the group consisting of: a tartaric acid, a gluconic acid, a citric acid, a gluconoheptanoic acid, a copolymer of an olefmically unsaturated non-acrylate sulfonate monomer and an olefmically unsaturated carboxylic acid monomer, and combinations thereof.

52. The method of claim 46, wherein an amount of the primary set retarder present in the cement composition is less than or equal to about 10% bwoc.

53. The method of claim 41, wherein the cement composition optionally further comprises a primary set retarder for increasing the thickening time of the cement composition, and
wherein the weight ratio of the secondary amine substituted with the carboxyl group to the primary retarder is in a range of from about 1:0 to about 1:50.

54. The method of claim 41, wherein the secondary amine substituted with the carboxyl group has a biodegradability of greater than or equal to about 60% BOD.

55. The method of claim 41, wherein the secondary amine substituted with the carboxyl group comprises 3-hydroxy N,N'-iminodisuccinic acid.

56. The method of claim 55, wherein the secondary amine substituted with the carboxyl group has a biodegradability of greater than or equal to about 60% BOD after a period of about 13 days and of greater than about 80% BOD after a period of about 28 days.

57. The method of claim 41, wherein the secondary amine substituted with the carboxyl group has a 96 hour $LC_{50}$ of greater than about 2,000 ppm.

58. The method of claim 41, wherein the secondary amine substituted with the carboxyl group is present in an amount ranging from about 0.001% to about 10% by weight of the cement composition.

59. The method of claim 41, wherein the cement composition further comprises water present in an amount ranging from about 33% to about 200% bwoc.

60. The method of claim 41, wherein the cement composition further comprises a strength-retrogression additive present in an amount ranging from about 10% to about 100% bwoc.

61. The method of claim 41, wherein the secondary amine substituted with the carboxyl group comprises a component selected from the group consisting of: an ethylenediamine-N,N'-disuccinic acid, a salt of an ethylenediamine-N,N'-disuccinic acid, a carboxymethylaspartic acid, a salt of a carboxymethylaspartic acid, a carboxyethylaspartic acid, a salt of a carboxyethylaspartic acid, an iminodiacetic acid, a salt of a iminodiacetic acid, an imminodisuccinic acid, a salt of an imminodisuccinic acid, a methylglycinedisuccinic acid, a salt of a methylglycinedisuccinic acid, a glutamic (salt)-N,N'diacetic acid, a salt of a glutamic (salt)-N,N'diacetic acid, a methylglycinediacetic acid, a salt of a methylglycinediacetic acid, a 3-hydroxy N,N'-iminodisuccinic acid, a salt of a 3-hydroxy N,N'-iminodisuccinic acid, copolymers thereof, terpolymers thereof, block polymers thereof, and combinations thereof.

* * * * *